UNITED STATES PATENT OFFICE.

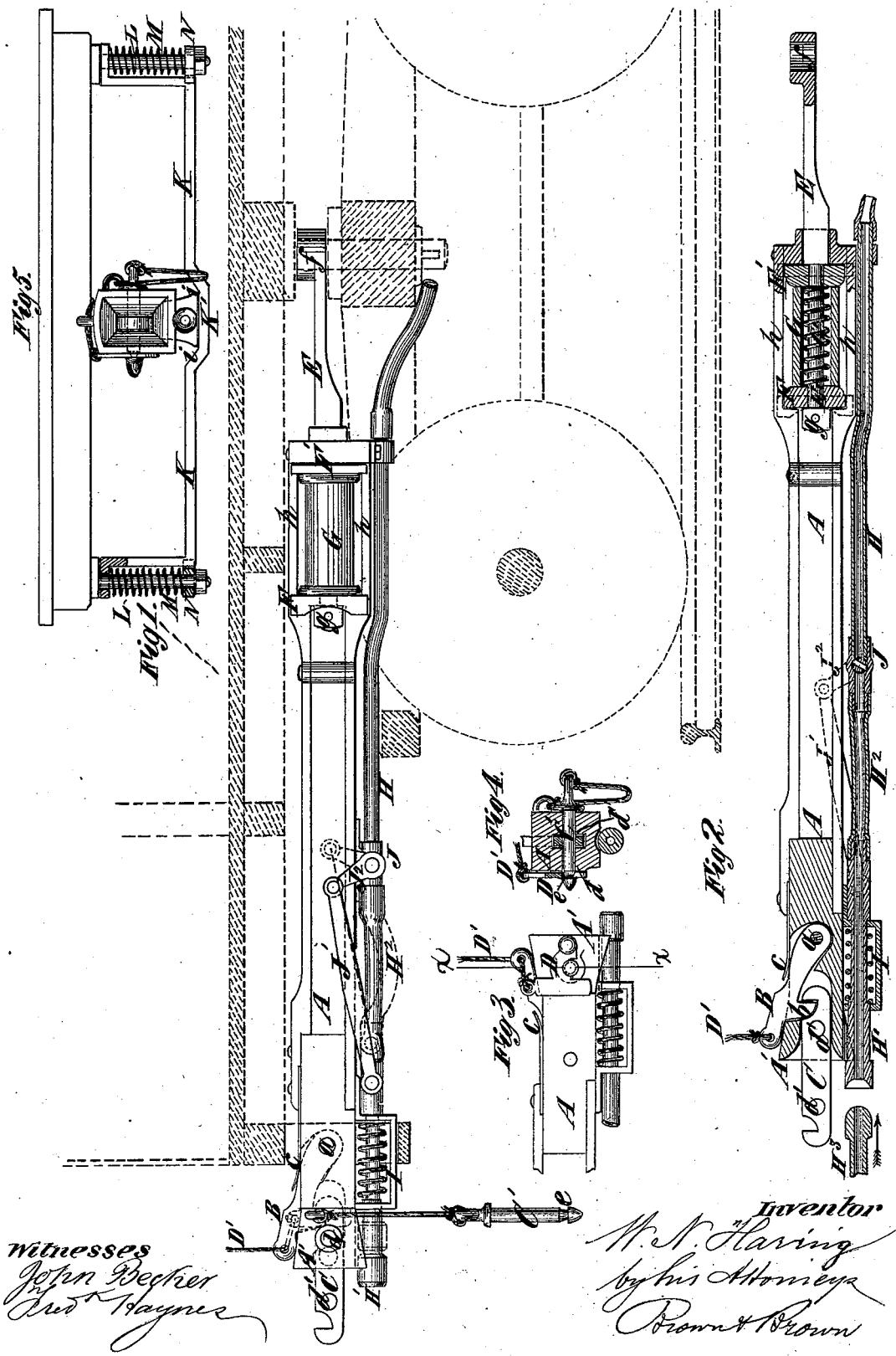

WILLIAM N. HARING, OF JERSEY CITY, NEW JERSEY, ASSIGNOR OF ONE-HALF OF HIS RIGHT TO JOHN C. KLATZL, OF NEW YORK, N. Y.

CAR-COUPLING.

SPECIFICATION forming part of Letters Patent No. 227,770, dated May 18, 1880.

Application filed November 14, 1879.

*To all whom it may concern:*

Be it known that I, WILLIAM N. HARING, of Jersey City, in the county of Hudson and State of New Jersey, have invented certain new and useful Improvements in Means for Coupling Railway-Cars, of which the following is a specification.

My invention relates to couplings which are used to connect the several cars of a train.

The invention consists in the combination, with a draw-bar head or socket, of a dog hinged thereto and furnished with a hook or tooth for engaging with a notch in the upper side of a connecting-link, a coupling-pin extending transversely through said head or socket, a locking-plate fitting in an annular groove in said pin for locking it in position, and a cord or other flexible connection, connected to said dog and locking-plate, for raising said dog and locking-plate simultaneously.

It also consists in the combination, with a swinging draw-bar, of a hose or pipe for containing a motive agent for operating a brake secured to said draw-bar and adapted to swing therewith.

It also consists in the combination, with such draw-bar, of a hose or pipe secured thereto, provided with a terminal or coupling piece susceptible of yielding longitudinally on contact with a section of hose or pipe carried by an adjacent car, and forced outward against the adjacent section of hose or pipe to maintain a tight and close contact therewith.

In the accompanying drawings, Figure 1 represents a side view of a draw-bar and hose or pipe coupling embodying my invention, a portion of a car being represented in dotted outline. Fig. 2 represents a vertical longitudinal section thereof. Fig. 3 represents an elevation of the opposite side of the draw-bar head or socket to that shown in Fig. 1. Fig. 4 is a transverse section thereof on the dotted line $x\,x$, Fig. 3; and Fig. 5 is an end view of a car-platform having my improved radius-bar attached.

Similar letters of reference designate corresponding parts in all the figures.

A represents the draw-bar, and A' the head or socket thereof.

B represents a dog, hinged in the draw-bar at $a$, and furnished near the other end with a hook or tooth, $b$, adapted to enter a vertical slot in the draw-bar head and to engage with a notch in the top of a connecting-link, C, of the form shown in Figs. 1 and 2. The end of this link is shown as rounded, and the tooth or hook $b$ shaped so that it may be automatically raised by the insertion of the link C.

A spring, $e$, may be employed to press upon the dog B and hold it in engagement with the link C.

For greater security I may employ a coupling-pin, C', which extends transversely through a hole, $d$, in the draw-bar and a corresponding hole, $d'$, in the connecting-link C. This pin is shown as provided with an annular groove, $e$, near its end, with which a locking-plate, D, engages when the pin is inserted in place, as shown clearly in Fig. 3, and thereby prevents its accidental displacement.

A cord, chain, or other flexible connection, D', shown as attached to the locking-plate and passed through an eye on the dog B, may be employed to raise the dog and permit the pin to be withdrawn simultaneously.

It is obvious that the coupling-pin C' forms a useful means of coupling in case of any injury to the dog B, and that it may be locked and released with the same facility and by the same means as the dog. Another advantage resulting from the use of the coupling-pin C' is, that it may be used to couple a car having my improved coupling with a car having the old link-coupling.

The draw-bar A is represented as connected to the king-bolt of the truck by means of a link, E, provided at the outer end with an eye, $f$, through which the king-bolt passes, thus enabling the draw-bar to swing freely in either direction. This link and the draw-bar are so connected that the latter has a slight longitudinal movement in either direction relatively to the former against a yielding resistance, so as to form a yielding buffer and draw-bar.

To the round shank E' of the link E are secured two heads, F and F', one of which rests against a shoulder on the link and the other of which is secured by means of a nut, $g$.

It will be observed that the draw-bar and the link E are so organized and connected together that they swing together, and hence that any strain or thrust upon the draw-bar is transmitted in a direct line through the link to the king-bolt.

The draw-bar is represented as having a wide slot or opening near one end, and the heads F and F' as provided with jaws or gibs which slide upon the sides $h$.

Interposed between the two heads F F', I have represented a yielding device, which, as here represented, consists of a hollow rubber spring, G, and a spiral metal spring, G', arranged within the same.

The heads F F' rest against the opposite ends of the slot or opening in a draw-bar, and upon a longitudinal movement of the draw-bar one of the said heads is held immovable while the other is moved, thereby compressing the springs G G' and offering a yielding resistance to the movement of the draw-bar. As the sides of the draw-bar between the plates $h$ are all open, facility is afforded for inserting and removing the springs G G' from the side.

In order to provide for the automatic coupling of the hose or pipes of vacuum or air brakes carried by the cars, I have provided the hose or pipes with a yielding terminal or coupling, and in this example of my invention the hose or pipe coupling represented comprises certain novel features which form no part of the present invention, but which may form the subject of a future application for Letters Patent. I have represented the said hose or pipes as each composed of a stationary section or piece, H, secured to the draw-bar, and an adjustable section, H', so arranged as to abut against the face of a section, H³, carried by an adjacent car, when the two cars are brought together for the purpose of coupling them.

I designates a spring acting on the adjustable section H' to push it outward, and maintaining a tight face-to-face contact between it and the section H³.

H² designates a piece of hose connecting the sections H' and H³, so as to permit of the longitudinal movement of the section H'.

The passage of air or other motive agent through the hose or pipe is controlled by a valve, J, to which the adjustable section of hose or pipe H' is connected by means of a rod or link, J', and a lever, J².

K designates a transom or guide-bar extending transversely across the end of a car-platform and supporting the free end of the draw-bar.

In order to enable the car-platform to move vertically and prevent undue strain upon the coupling due to the jolting of the cars, I construct the transom or guide-bar so as to yield vertically.

As here represented the transom or guide-bar is supported by the bolts L at each end, and springs M (here shown as of spiral form) are interposed between the transom or guide-bar and washers or plates N, for holding the transom or guide-bar in position and at the same time permit it to yield downwardly.

The washers or plates N are provided with notches, into which the ends of the transom or guide-bar fit, and by which the latter is guided in its vertical movements.

In order to hold the draw-bar in its central position for convenience in coupling the cars, the transom or guide-bar is depressed at its central portion, K', and such depressed portion is joined to the main portions by inclines $i$, as clearly shown in Fig. 5, so as to enable the draw-bar to swing sidewise when necessary.

What I claim as my invention, and desire to secure by Letters Patent, is—

1. The combination, with the draw-bar head or socket A', of the dog B, hinged thereto, the coupling-pin C', the locking-plate D, and a cord, chain, or other flexible connection for simultaneously raising said dog and locking-plate, substantially as specified.

2. The combination, with a swinging draw-bar, of a hose or pipe for containing a motive agent for operating a brake secured to said draw-bar and adapted to swing therewith, substantially as specified.

3. The combination, with a swinging draw-bar, of a hose or pipe secured thereto, provided with a terminal or coupling piece susceptible of yielding longitudinally on contact with a section of hose or pipe carried by an adjacent car, and forced out against said adjacent section, so as to maintain a tight and close contact therewith, substantially as specified.

W. N. HARING.

Witnesses:
 CHANDLER HALL,
 T. J. KEANE.